United States Patent
Masuda

Patent Number: 5,216,222
Date of Patent: Jun. 1, 1993

[54] ATTITUDE CONTROL SYSTEM FOR CNC LASER BEAM MACHINING APPARATUS

[75] Inventor: Teruo Masuda, Minamitsuru, Japan

[73] Assignee: Fanuc Ltd., Minamitsuru, Japan

[21] Appl. No.: 773,594

[22] PCT Filed: Mar. 13, 1991

[86] PCT No.: PCT/JP91/00357
§ 371 Date: Nov. 21, 1992
§ 102(e) Date: Nov. 21, 1992

[87] PCT Pub. No.: WO91/14531
PCT Pub. Date: Oct. 3, 1991

[30] Foreign Application Priority Data
Mar. 29, 1990 [JP] Japan .................................. 2-81693

[51] Int. Cl.⁵ .................................. B23K 26/08
[52] U.S. Cl. ........................ 219/121.78; 219/121.79
[58] Field of Search ...................... 219/121.78, 121.79;
364/474.08; 318/568.11, 568.15

[56] References Cited

U.S. PATENT DOCUMENTS

| | | | |
|---|---|---|---|
| 4,554,497 | 11/1985 | Nozawa et al. | 318/636 |
| 4,621,333 | 11/1986 | Watanabe | 364/513 |
| 4,706,003 | 11/1987 | Nakashima et al. | 318/568 |
| 5,067,086 | 11/1991 | Yamazaki et al. | 219/121.79 X |

Primary Examiner—C. L. Albritton
Attorney, Agent, or Firm—Staas & Halsey

[57] ABSTRACT

An attitude control system controls the attitude of a nozzle of a CNC laser beam machining apparatus with respect to a workpiece surface being three-dimensionally machined thereby. An interpolator (1) for interpolating values with respect to $\alpha$-, $\beta$-, X-, Y-, and Z-axes produces interpolation outputs (P$\alpha$, P$\beta$) for the $\alpha$- and $\beta$-axes. The interpolation output (P$\alpha$) for the $\alpha$-axis is read by a corotation compensator (2), which calculates a corotation corrective ($\Delta\beta$) depending on the gear ratio of gears by which horizontal and vertical shafts of the $\beta$-axis are coupled to each other. The corotation corrective ($\Delta\beta$) is added to the interpolation output (P$\beta$) for the $\beta$-axis by an adder (4), making it possible to compensate for a corotation with respect to a desired gear ratio of the gears by which horizontal and vertical shafts of the $\beta$-axis are coupled to each other.

5 Claims, 3 Drawing Sheets

ATTITUDE CONTROL SYSTEM FOR CNC LASER BEAM MACHINING APPARATUS

TECHNICAL FIELD

The present invention relates to an attitude control system for controlling the attitude of a nozzle of a CNC laser beam machining apparatus with respect to a workpiece surface being three-dimensionally machined thereby, and more particularly to an attitude control system for compensating for a corotation of one axis with a rotation about another axis of a CNC laser beam machining apparatus.

BACKGROUND ART

There have been widely used computerized numerically controlled (CNC) laser beam machining apparatus composed of a laser oscillator and a computerized numerical control (CNC) system. Particularly, the high-speed machining capability of a laser beam machining apparatus and the complex profile control of a CNC system are coupled to each other for the high-speed machining of a complex configuration in a non-contact fashion. CNC laser beam machining apparatus, in particular, capable of three-dimensional machining that cannot be performed by conventional punch presses, nibbling machines, or the like have been put to practical use.

For three-dimensionally machining a workpiece on a CNC laser beam machining apparatus, it is necessary to control X-, Y-, and Z-axes and also to control the attitude of a nozzle on the tip end of a hand. The control axes use for the control of the attitude of the nozzle are referred to as $\alpha$- and $\beta$-axes. There are two types of nozzle head mechanisms, described below, for controlling the attitude of a nozzle.

The first type of nozzle head mechanism is known as a zero-offset or one-point-oriented type nozzle head mechanism that has an $\alpha$-axis as a rotational axis with respect to a Z-axis, and a $\beta$-axis as a rotational axis inclined with respect to the Z-axis.

The second type of nozzle head mechanism is referred to as an offset type nozzle head mechanism that has an $\alpha$-axis as a rotational axis with respect to a Z-axis, and a $\beta$-axis as a rotational axis perpendicular to the Z-axis.

The zero-offset type nozzle head mechanism is complex in mechanism structure, but can be controlled easily and is preferable from the standpoint of nozzle control since the position of the tip end of the nozzle remains unchanged even when the positions of the X-, Y-, and Z-axes change. One attitude control system for a CNC laser beam machining apparatus with a zero-offset type nozzle head mechanism is disclosed in Japanese Laid-Open Patent Publication No. 1-162592 filed by the applicant.

The offset type nozzle head mechanism requires a complex control process and is not suitable for high-speed machining though the mechanism structure is simple. Japanese Laid-Open Patent Publication No. 1-22419 filed by the applicant discloses a system for controlling the attitude of an offset type nozzle.

In either type of nozzle head mechanism, however, when the components rotate about the $\alpha$-axis, they also rotate about the $\beta$-axis. Since the components are rotated about the $\beta$-axis by the rotation about the $\alpha$-axis, it is necessary to compensate for the corotation about the $\beta$-axis. Particularly, for such corotation compensation, the gear ratio of gears which couple vertical and horizontal shafts for the $\beta$-axis is limited to 1:1. This has posed problems with respect to the service life and mechanical strength of the gears.

DISCLOSURE OF THE INVENTION

In view of the aforesaid problems of the conventional CNC laser beam machining apparatus, it is an object of the present invention to provide an attitude control system for a CNC laser beam machining apparatus, which system allows the gear ratio of gears which couple vertical and horizontal shafts for a $\beta$-axis to be selected as desired.

To achieve the above object, there is provided in accordance with the present invention an attitude control system for controlling the attitude of a nozzle of a CNC laser beam machining apparatus with respect to a workpiece surface being three-dimensionally machined thereby, the attitude control system comprising an interpolator for effecting interpolation with respect to X-, Y-, Z-, $\alpha$-, and $\beta$-axes, corotation compensating means for compensating for a corotation of the $\beta$-axis due to a rotation of the $\alpha$-axis depending on a gear ratio of gears by which horizontal and vertical shafts of the $\beta$-axis are coupled to each other, and an adder for adding a compensation output of the corotation compensating means to an output for the $\alpha$-axis from the interpolator.

The interpolator for interpolating values with respect to the $\alpha$-, $\beta$-, X-, Y-, and Z-axes produces interpolation outputs for the $\alpha$- and $\beta$-axes. The interpolation output for the $\alpha$-axis is read by the corotation compensating means, which calculates a corotation corrective depending on the gear ratio of gears by which horizontal and vertical shafts of the $\beta$-axis are coupled to each other. The corotation corrective is added to the interpolation output for the $\beta$-axis by the adder, making it possible to compensate for a corotation with respect to a desired gear ratio of the gears by which horizontal and vertical shafts of the $\beta$-axis are coupled to each other.

BEST MODE FOR CARRYING OUT THE INVENTION

An embodiment of the present invention will hereinafter be described with reference to the drawings.

Figure 1:
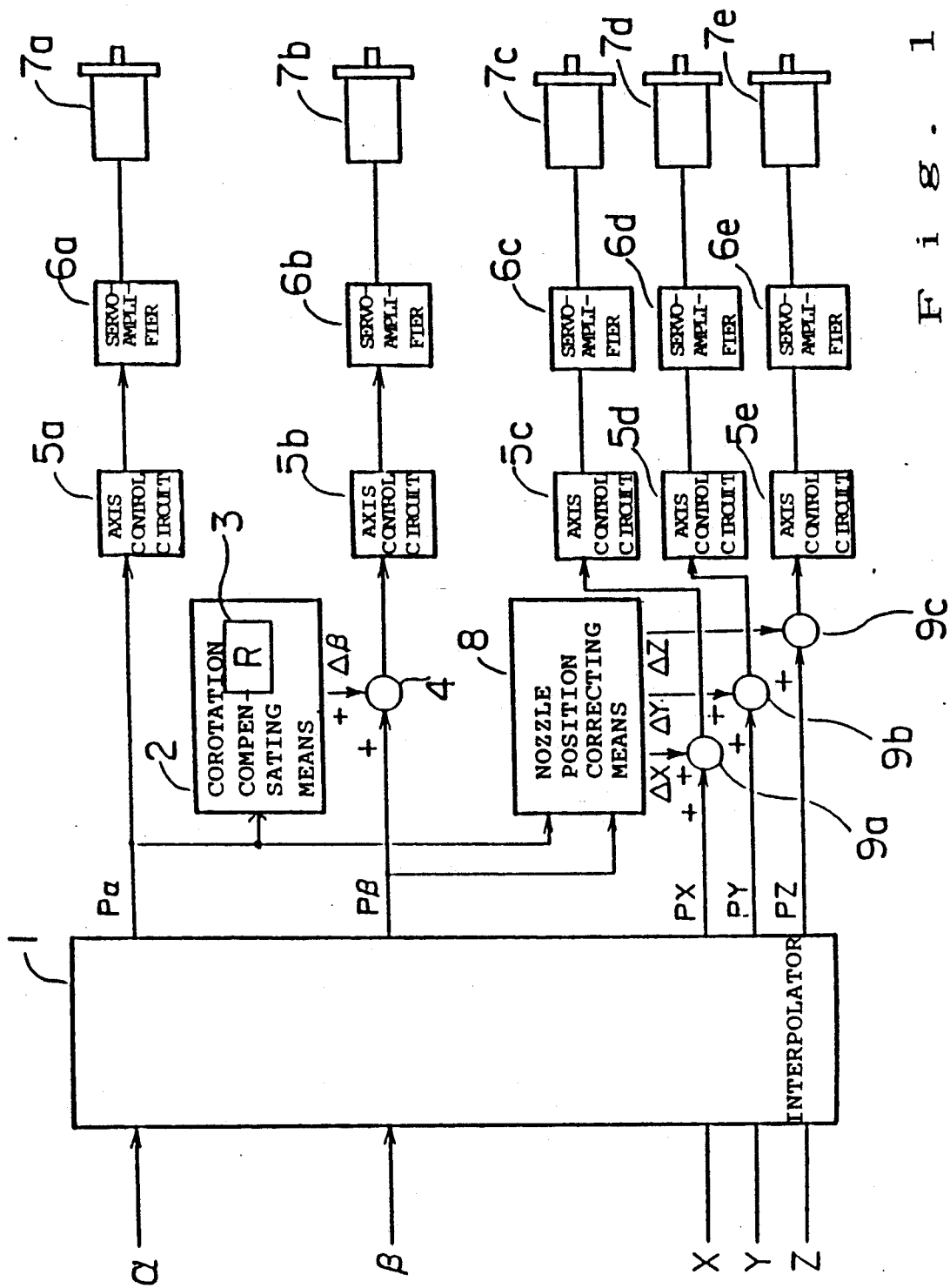
FIG. 1 is a block diagram of a numerical control system for controlling a CNC laser beam machining apparatus according to the present invention.

FIG. 1 shows in block form a numerical control system for controlling a CNC laser beam machining apparatus according to the present invention. The numerical control system includes an interpolator 1 that is supplied with commands with respect to paths (X, Y, Z) of a control point to be machined, and an attitude ($\alpha$, $\beta$) of a nozzle. In response to the commands, the interpolator 1 effects simultaneous interpolation for the five axes. Essentially, the X-, Y-, and Z-axes should be interpolated taking into account the movement of the $\alpha$- and $\beta$-axes. Such an interpolation, however, would require vector calculations and result in an enormous period of calculation time, and hence would not be able to effect laser beam machining at practical speed. In view of this, the interpolator 1 interpolates the X-, Y-, and Z-axes while ignoring the movement of the α- and β-axes. Therefore, the interpolation of the X-, Y-, and Z-axes is the same as the interpolation in ordinary numerical control systems and can be calculated at high speed.

The numerical control system also includes a corotation compensating means 2 for calculating a corotation corrective for the β-axis from an interpolation output Pα for the α-axis from the interpolator 1. Details of such calculation will be described later on. The corotation compensating means 2 includes a register 3 for storing a remainder that is produced when the corotation corrective is calculated. The corotation corrective, denoted by Δβ, from the corotation compensating means 2 is added to an interpolation output Pβ for the β-axis from the interpolator 1 by an adder 4. The interpolation output Pα, and the interpolation output Pβ with the corotation corrective Δβ added thereto, are supplied to axis control circuits 5a, 5b, respectively. Output signals from the axis control circuits 5a, 5b are amplified by respective servoamplifiers 6a, 6b, which energize respective servomotors 7a, 7b to control the rotation of components about the α- and β-axes.

The numerical control system further includes a nozzle position correcting means 8 for calculating correctives ΔX, ΔY, ΔZ to be given to the X-, Y-, and Z-axes upon movement of the α- and β-axes. The calculation of the correctives ΔX, ΔY, ΔZ can be effected at higher speed than would be if simultaneous interpolation were carried out for the five axes.

The correctives ΔX, ΔY, ΔZ are added to interpolation outputs PX, PY, PZ for the X-, Y-, and Z-axes from the interpolator 1 by respective adders 9a, 9b, 9c, which supply sum output signals to respective axis control circuits 5c, 5d, 5e. Output signals from the axis control circuits 5c, 5d, 5e are amplified by respective servoamplifiers 6c, 6d, 6e which energize respective servomotors 7c, 7d, 7e to control the rotation of components about the X-, Y-, and Z-axes. In this manner, the nozzle is controlled so as not to change in its position regardless of the rotation about the α- and β-axes.

The interpolator 1, the corotation compensating means 2, the nozzle position correcting means 8, the adder 4, and the other circuits are controlled by a microprocessor in the numerical control system. For high-speed processing, the nozzle position correcting means 8 is controlled by a dedicated microprocessor to make it possible to effect three-dimensional laser beam machining at high speed.

The nozzle position correcting means 8 is necessary for use with an offset type nozzle head mechanism, but is not required by a zero-offset type nozzle head mechanism because the position of the tip end of the nozzle remains unchanged upon rotation about α- and β-axes.

Figure 2:
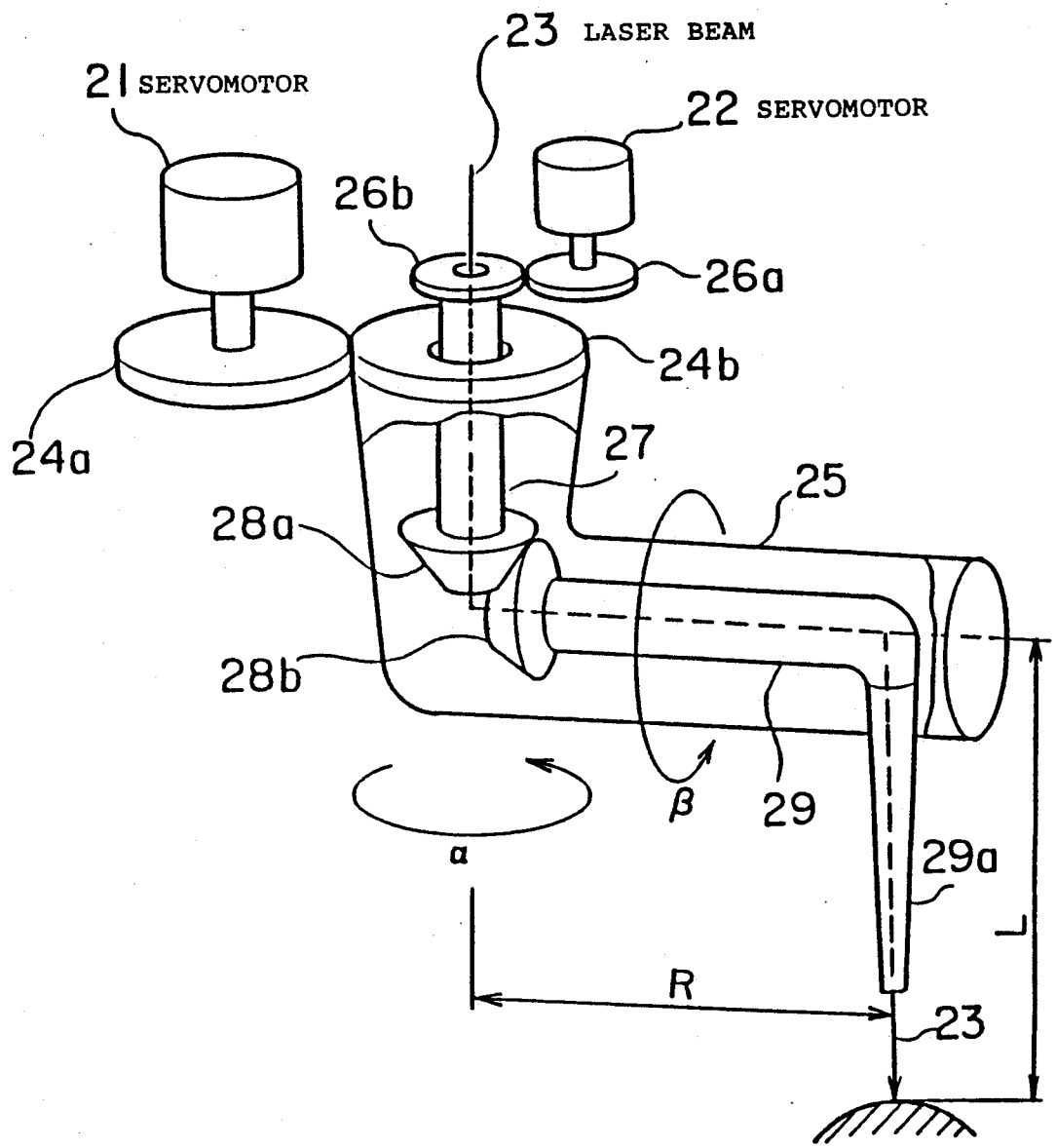
FIG. 2 is a perspective view of an offset type nozzle head mechanism according to an embodiment of the present invention.

FIG. 2 shows an offset type nozzle head mechanism according to an embodiment of the present invention. A servomotor 21 actuates components to rotate about an α-axis, and a servomotor 22 actuates components to rotate about a β-axis. A laser beam 23 is guided to the tip end of a nozzle 29a by reflecting mirrors (not shown), and applied to a workpiece.

The α-axis is a rotational axis with respect to a Z-axis. An arm 25 is rotatable about the α-axis by the servomotor 21 which transmits its rotation through gears 24a, 24b to the arm 25.

When the servomotor 22 is rotated, a vertical shaft 27 is rotated by gears 26a, 26b, causing bevel gears 28a, 28b to rotate a horizontal shaft 29 about the β-axis. The nozzle 29a is fixed to the horizontal shaft 29. The gear ratio of the bevel gears 28a, 28b is a:b.

Corotation compensation will be described in detail below. When the arm 25 rotates about the α-axis, since the bevel gear 28b meshes with the bevel gear 28a, the β-axis rotates, resulting in a change in the position of the nozzle 29a. That is, the rotation about the α-axis causes a corotation of the β-axis. To compensate for such a corotation, the corotation corrective Δβ from the corotation compensating means 2 is added to the interpolation output Pβ for the β-axis by the adder 4, thereby keeping the nozzle 29a in the original position about the β-axis.

It is assumed that interpolation outputs for the α-and β-axes in each interpolation cycle are indicated respectively by ΔPα, ΔPβ, the nozzle 29a is corotated in a direction D (positive if rotated in normal direction), a previous remainder is indicated by $R_{n-1}$, and a present remainder by $R_n$. Then, the corotation corrective Δβ can be determined from the equation:

$$(\Delta\alpha \cdot a \cdot D + R_{n-1})/b = (\Delta\beta + R_n/b)$$

and hence by the following equation:

$$\Delta\beta = (\Delta\alpha \cdot a \cdot D + R_{n-1})/b - (R_n/b).$$

If the remainder $R_n$ is stored in the register 3 shown in FIG. 1, and calculated each time the interpolation outputs are produced, then no accumulated error is generated.

As is apparent from the above description, even when the gear ratio a:b is not 1:1 or is not an integer ratio, the corotation corrective Δβ can be determined. Consequently, the gear ratio of the bevel gears 28a, 28b can be selected as desired.

The correctives in the nozzle position correcting means 8 can be determined by the following equations:

$$\Delta X = \Delta X(\alpha) - \Delta Y(\beta)\sin\alpha$$
$$= R\cos\alpha - L\sin\alpha \cdot \sin\beta$$
$$\Delta Y = \Delta Y(\alpha) + \Delta Y(\beta)\cos\alpha$$
$$= R\sin\alpha - L\cos\alpha \cdot \sin\beta$$
$$\Delta Z = \Delta Z(\beta) = -L\cos\beta.$$

The trigonometric functions, etc. can be determined at higher speed if a coprocessor or the like is employed.

Figure 3:
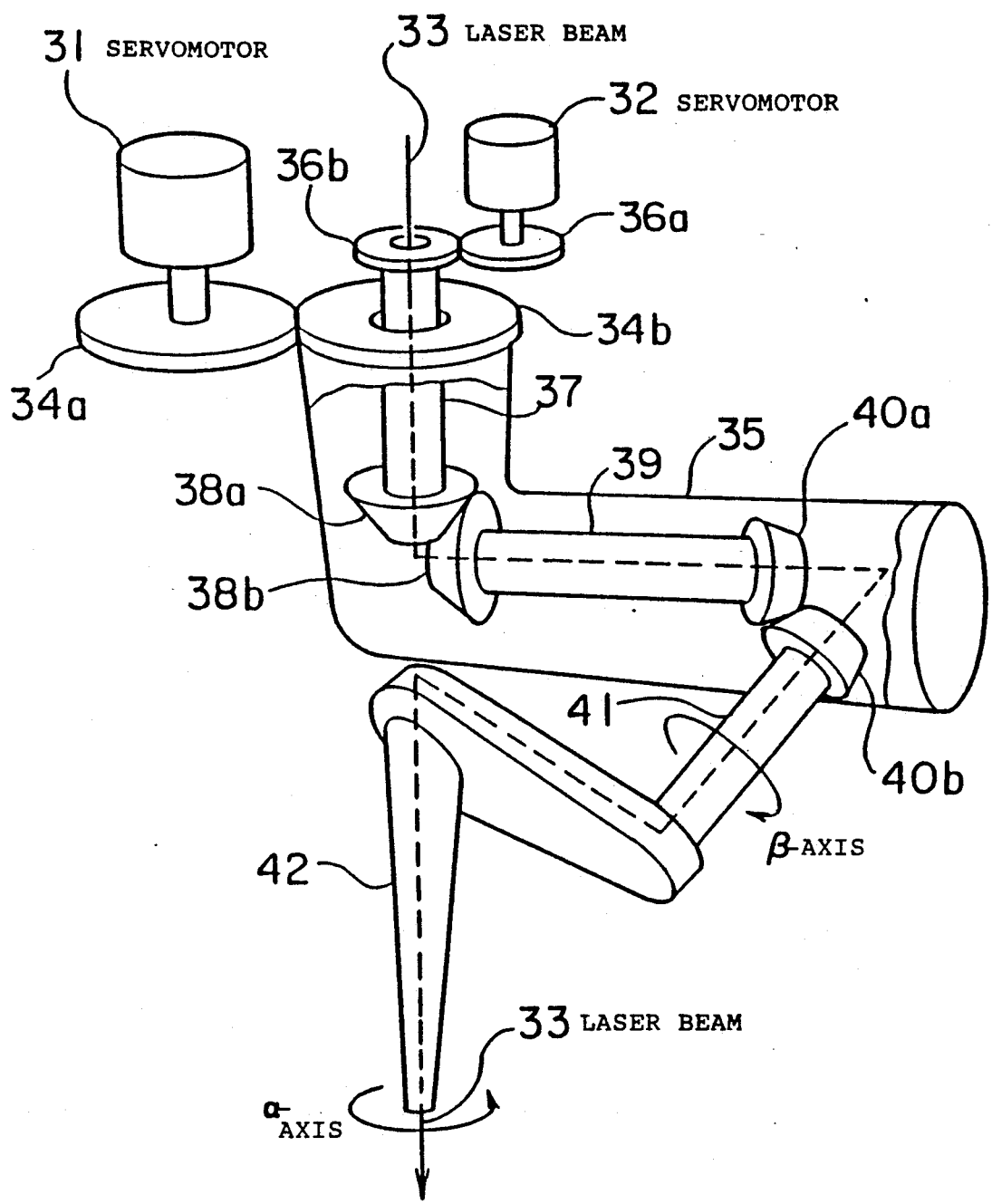
FIG. 3 is a perspective view of a zero-offset type nozzle head mechanism according to an embodiment of the present invention.

FIG. 3 shows a zero-offset type nozzle head mechanism according to an embodiment of the present invention. A servomotor 31 actuates components to rotate about an α-axis, and a servomotor 32 actuates components to rotate about a β-axis. A laser beam 33 is guided to the tip end of a nozzle 42 by reflecting mirrors (not shown), and applied to a workpiece.

The α-axis is a rotational axis with respect to a Z-axis. An arm 35 is rotatable about the α-axis by the servomotor 31 which transmits its rotation through gears 34a, 34b to the arm 35.

When the servomotor 32 is rotated, a vertical shaft 37 is rotated by gears 36a, 36b, causing bevel gears 38a, 38b to rotate a horizontal shaft 39. The rotation of the horizontal shaft 39 causes bevel gears 40a, 40b to rotate a shaft 41 about the β-axis.

When the servomotor 31 is rotated, the arm 35 rotates about the α-axis, and hence the horizontal shaft 39 also rotates about the α-axis. The meshing bevel gears 38*a*, 38*b* also rotate to cause the β-axis to rotate with the rotation about the α-axis. The corotation of the β-axis can also be compensated for by the corotation compensating means 2 as with the offset type nozzle head mechanism described above. More specifically, with the gear ratio of the bevel gears 38*a*, 38*b* being a:b, the corotation corrective Δβ is determined according to the above equation, and added to the interpolation output Pβ for the β-axis. The gear ratio a:b may not necessarily be an integer.

Regardless of whether an offset or zero-offset nozzle head mechanism is employed, a corotation of the β-axis caused by a rotation about the α-axis can be compensated for irrespective of the gear ratio of the gears by which the horizontal and vertical shafts of the β-axis are coupled to each other.

As described above, the corotation compensating means is provided to compensate for a corotation caused by a rotation about the α-axis irrespective of the gear ratio of the gears by which the horizontal and vertical shafts of the β-axis are coupled to each other. As a consequence, the gear ratio of the nozzle head mechanism can freely be selected.

I claim:

1. An attitude control system for controlling the attitude of a nozzle of a CNC laser beam machining apparatus with respect to a workpiece surface being three-dimensionally machined thereby, said attitude control system comprising:

an interpolator for effecting interpolation with respect to X-, Y-, Z-, α-, and β-axes;

corotation compensating means for compensating for a corotation of said β-axis due to a rotation of said α-axis depending on a gear ratio of gears by which horizontal and vertical shafts of said β-axis are coupled to each other; and an adder for adding a compensation output of said corotation compensating means to an output for the α-axis from said interpolator.

2. An attitude control system according to claim 1, wherein said corotation compensating means includes a register for storing a remainder which is produced when a corrective for the corotation is calculated by said corotation compensating means.

3. An attitude control system according to claim 1, wherein the nozzle is mounted on an offset type nozzle head mechanism.

4. An attitude control system according to claim 3, further including nozzle position correcting means for correcting a change in the position of a tip end of the nozzle depending on the rotation of said α- and β-axes, thereby holding the position of the tip end of the nozzle.

5. An attitude control system according to claim 1, wherein the nozzle is mounted on a zero-offset type nozzle head mechanism.

* * * * *

UNITED STATES PATENT AND TRADEMARK OFFICE
CERTIFICATE OF CORRECTION

PATENT NO. : 5,216,222
DATED : June 1, 1993
INVENTOR(S) : Teruo Masuda

It is certified that error appears in the above-identified patent and that said Letters Patent is hereby corrected as shown below:

Title Page, at [86], "§ 371 Date: Nov. 21, 1992"

should be --§ 371 Date: Nov. 21, 1991--; and

"§ 102(e) Date: Nov. 21, 1992" should be

--§ 102(e) Date: Nov. 21, 1991--.

Signed and Sealed this

Eighth Day of February, 1994

Attest:

BRUCE LEHMAN

Attesting Officer    Commissioner of Patents and Trademarks